June 28, 1960 S. WLASUK 2,943,144

TELEVISION TEST EQUIPMENT

Filed May 25, 1956 2 Sheets-Sheet 1

INVENTOR.
STEVEN WLASUK
BY [signature]
ATTORNEY

June 28, 1960 S. WLASUK 2,943,144

TELEVISION TEST EQUIPMENT

Filed May 25, 1956 2 Sheets-Sheet 2

INVENTOR.
STEVEN WLASUK

BY Olin Whitehill

ATTORNEY

United States Patent Office 2,943,144

Patented June 28, 1960

2,943,144

TELEVISION TEST EQUIPMENT

Steven Wlasuk, Brooklawn, N.J., assignor to Radio Corporation of America, a corporation of Delaware Filed May 25, 1956, Ser. No. 587,430

7 Claims. (Cl. 178—5.4)

The invention relates to color television apparatus, and it particularly pertains to equipment for testing the operation of color television apparatus.

With the advent of color television, it was found desirable to provide some source of signal simulating the characteristics of the standard signal approved by the Federal Communications Commission for U.S. broadcast use. Television test equipment has been devised for generating signals which can be used to calibrate or otherwise adjust the particular television apparatus under test provided the color matrixing circuitry is in proper operating order. However, such equipment as known to the art does not enable the serviceman to correct for faulty operation of the matrixing circuitry without numerous amplitude measurements as indicated on an oscilloscope. Actual color television programs on the air cannot be used as a consistent source of test signal for checking the operation of the receiver matrixing circuitry; and furthermore, until such time as color television broadcasts are on a more regular basis, the serviceman may not at all hours be able to tune the receiver to a color broadcast at the time he needs the signal. It is, therefore, highly desirable to have a portable and accurate instrument for generating a test signal suitable for checking and adjusting the color matrixing circuitry of color television receivers.

An object of the invention is to provide means for checking the matrixing circuitry of color television apparatus.

According to the invention, equipment for generating a number of differently colored vertical bars on the face of the color television display device is provided with circuitry for effectively interposing an adjustable luminance component in the test signal to be subtracted from the color bar chrominance component. By adjusting the luminance component to just cancel the color bar at the face of the display device, that is the receiver kinescope or a test oscilloscope, the luminance component is effectively measured for each color. The relative luminance between different colors is a measure of the efficacy of the matrixing circuitry of the apparatus under test.

According to one form of the invention, means are coupled to the color bar producing circuitry of test equipment for developing a train of pulses coincident in time with the bursts of color bar producing oscillations. This train of pulses is applied to further circuitry of the test equipment as pedestal pulses which vary the alternating axis of the bursts of color bar producing oscillations about the illumination reference level of the television apparatus under test. By varying the amplitude of the pedestal pulses the demodulated chrominance component of the test signal is eliminated and the operating efficacy of the matrixing circuitry can be checked by noting whether or not the amplitude of pedestal necessary to cancel the color bar conforms to the value established for standard color television program transmission.

In order that the invention may be readily put to practice and all the attendant advantages realized, an embodiment of the invention, given by way of example only, will be described with reference to the accompanying drawing in which.

Figure 1:
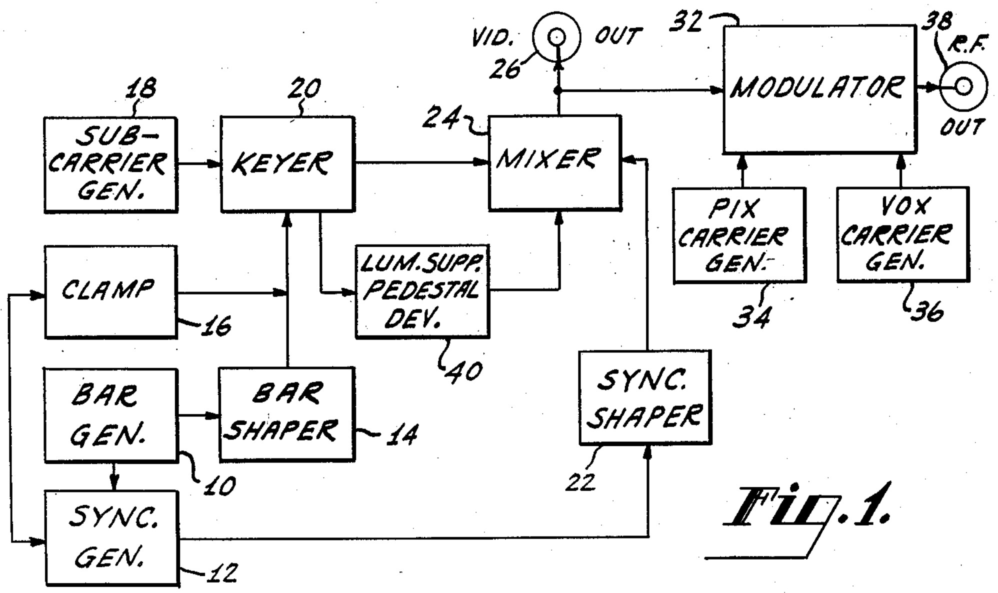
Fig. 1 is a functional diagram showing the operating principle of an example of test equipment modified according to the invention.

While the invention is applicable in many forms, it will be described in conjunction with color bar generating Television Test Apparatus disclosed in the copending U.S. patent application Serial No. 440,358, filed 30 June 1954, by Steven Wlasuk. A functional diagram of this apparatus as modified according to the invention is shown in Fig. 1. A color bar controlling circuit 10 is arranged to generate a pulse wave of 189 kc. which is the twelfth multiple of the standard horizontal deflection synchronizing frequency 15.75 kc. This pulse wave is applied to a horizontal deflection synchronizing pulse generator 12 and to bar shaping circuit 14. The shaped 189 kc. pulses, appearing in the output of the bar shaping circuit 14 are clamped by means of a circuit 16 to suppress a pulse and applied along with oscillations of an offset subcarrier frequency obtained from a generator 18 to a subcarrier keying circuit 20. Horizontal synchronizing pulses, produced by the horizontal signal pulse generating circuit 12, are employed to clamp the input of the keying circuit 20. The clamp 16 is keyed on by the application to it of the horizontal synchronizing pulses at each time that the twelfth pulse from the bar shaper 14 occurs so that every twelfth pulse of the 189 kc. pulse train is removed.

Another portion of the output of generator 12 is shaped by a horizontal synchronizing pulse shaping circuit 22, and each time that the 189 kc. pulse is removed from the input to the keying circuit 20, a synchronizing pulse is supplied by the synchronizing pulse shaping circuit 22 to a combining circuit 24 to which the keying circuit 20 is also coupled. A train of synchronizing pulses interposed with bursts of offset subcarrier oscillations are thus produced at the output terminals 26 of the combining circuit 24.

If the apparatus is to be used in conjunction with television transmitters, the output of combining circuit 24 may be applied to a video amplifier (not shown) and thence to the input of the RF section of the transmitter. This provides the television station with color bar signals for transmission.

On the other hand, if it is desired to use the apparatus to check receiver performance, the output of the combining circuit 24 is applied to a picture carrier modulating circuit 32 which is excited by a picture carrier oscillator 34. A sound carrier oscillator 36 is arranged to add a sound carrier to the modulated picture carrier. A clamping circuit (not shown) may be provided for clamping at the level of the tips of the synchronizing pulses inserted by the combining circuit 24 for fixing the maximum picture carrier output. The combined sound and picture components may then be applied to the antenna terminals of any color television receiver for test purposes.

The subcarrier generating circuit 18 is not arranged to operate at the conventional burst frequency of 3.579545, but rather at the burst frequency plus or minus multiples of the line frequency of 15.75000 kc. The keying circuit 20 is thus arranged to transmit eleven consecutive bursts of 3.563795 mc. to the combining circuit 24. Ten of the bursts are effective to produce ten vertical colored bars on the device and one is effective to synchronize the local color reference signal generator in the color receiver. The horizontal synchronizing pulse is inserted during the interval which would be occupied by the first pulse from the bar shaping circuit 14.

Figure 2:
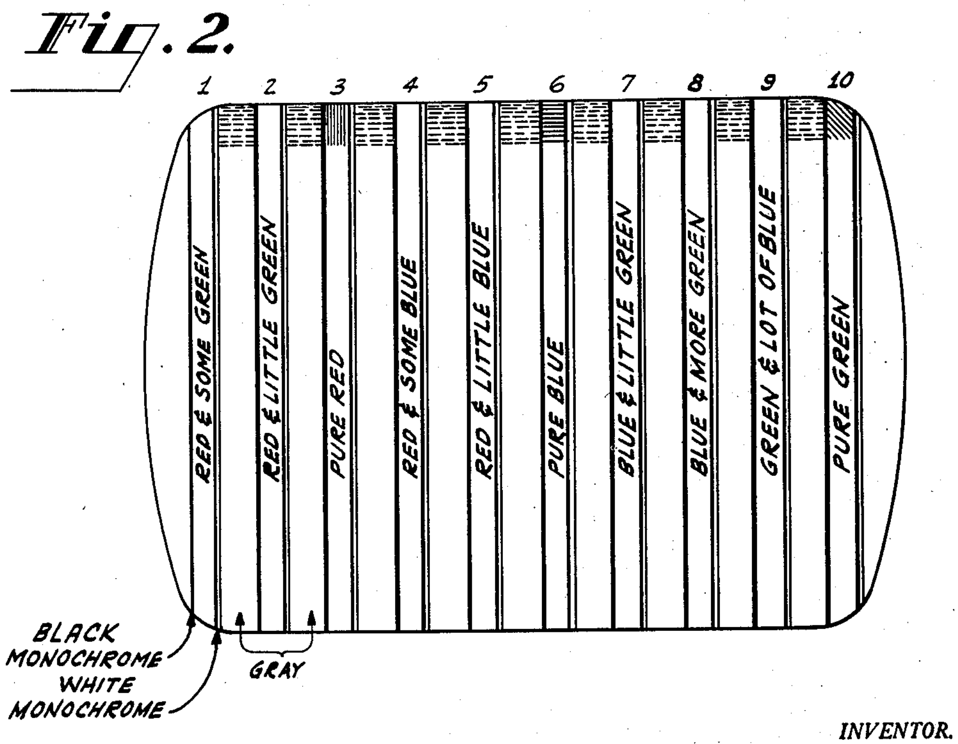
Fig. 2 is a graphical representation of color bars developed on a tricolor kinescope screen in response to signals obtained with test equipment suitable for modification according to the invention.

The output of offset subcarrier oscillator 18 is keyed into discrete units, to break up the spectrum, or rainbow progression, of colors which would otherwise be displayed from one side to the other on the color receiver image reproducing device. This results from the fact that the frequency of the wave produced by the oscillator 18 beats with the frequency of the local oscillator in the receiver so as to produce a difference frequency of 15.750 kc. times N, where N is any whole number. The latter frequency is, of course, the same as the horizontal line frequency. This means that for each line the wave produced by oscillator 18 will be displaced by one or more cycles. In other words, there will be a phase variation of 360° or multiples thereof for each horizontal line. This difference frequency is, in effect, a phase modulated sweep frequency which sweeps the color circuits in the receiver so as to produce the complete range of colors on the kinescope. However, since the 3.56 subcarrier is keyed only in response to the 189 kc. and the 15.75 kc. pulses applied to the keying circuit 20, the presentation is that of a number of vertical bars on the kinescope as shown in Fig. 2. Since twelve bursts of the 3.56 mc. frequency are provided (one burst being replaced by a horizontal synchronizing pulse), there is a phase separation of 30° between each burst or a 360° overall shift on each line.

It is to be noted that a black area appears to the left of each vertical color bar, and a white area appears on the right side of each bar on the kinescope screen. These black and whtie areas are produced by generating small monochrome pips at the beginning and end of each discrete unit keyed by the color subcarrier keying circuit 20. If the receiver circuit bandpass filtering is not correct, these black and white areas will be displaced either to the left or right and will not embrace the vertical color bar.

So long as the portions of the color television receiver including the matrixing circuitry are working properly, the display shown in Fig. 2 will be obtained. If the matrixing circuitry is misfunctioning to the extent that the colors reproduced are not truly representative of the colors of the scene televised, it may be difficult for the technician to determine the fact with the prior art test equipment.

According to the invention such misfunctioning is readily determined on measuring the relative values of the color bars of the component colors, red, green and blue by injecting a luminance component into the test signal of proper value to just cancel the luminance component of the bar producing color burst. Referring again to Fig. 1, a luminance component suppressing pedestal developing circuit 40 is interposed in the test equipment as thus far described to inject a pedestal into the signal at the combining circuit 24.

The pedestal is injected in this combining circuit 24 in such manner as to drive the bursts of offset subcarrier oscillation to which the pedestal corresponds out of the luminance region into black level. The degree of such drive depends on the luminance component of the particular burst. In order to clearly determine the limits of such drive, it is preferable that the television receiver be made to respond only to the particular color test signal under consideration. This is readily done in practice by short circuiting or otherwise removing the input to the electron guns corresponding to the other colors. When this is done the pattern displayed on the image reproducing device consists of a number of bars as shown in Fig. 2 but all of the various bars and the background areas will be constituted by different shades of the same color. For example, with the red and green guns grounded, the sixth bar will remain the brightest blue while the other bars will have lesser amounts of blue showing. The pedestal is adjusted until the sixth bar just disappears into the background color on either side, at which point the amplitude of the pedestal will be a measure of the demodulated component of the signal under consideration. The pedestal may be developed according to known techniques by generating a square wave and suitably synchronizing the timing of the square wave to coincide with the currents of the bursts of offset subcarrier oscillations. The amplitude of the pedestals may be varied in a number of ways, an obvious way being to generate a pedestal of large amplitude and provide adjustable attenuation to place it at the proper level. According to the invention, the timing is readily synchronized by developing the pedestal from the tube current of the burst keying circuit 20.

Figure 3:
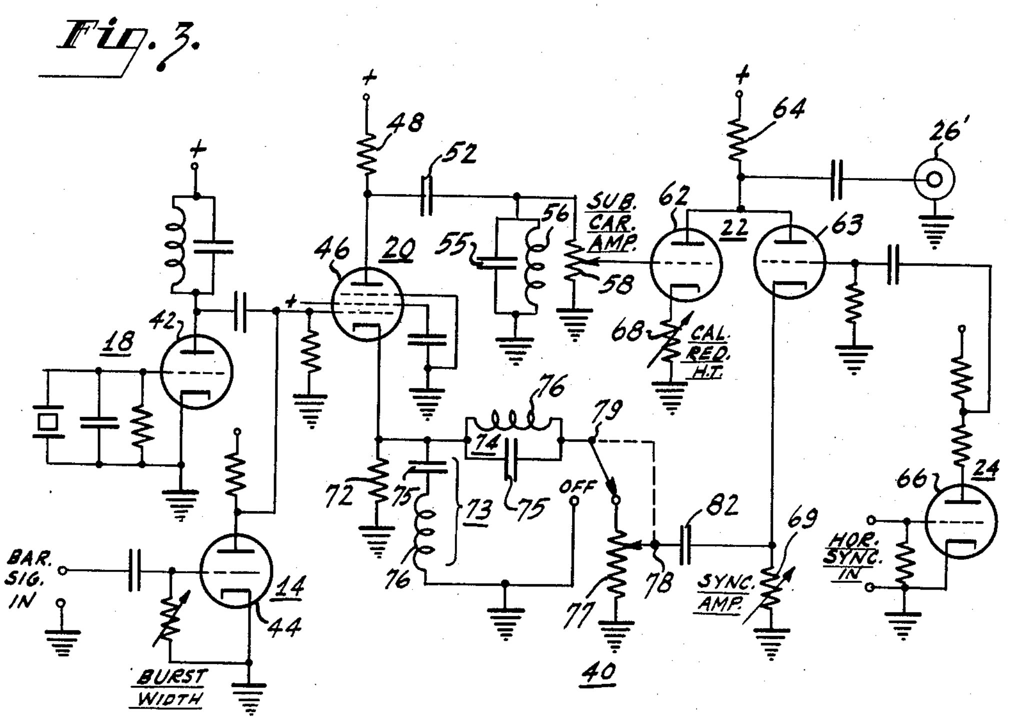
Fig. 3 is a schematic diagram showing circuitry for performing the functions of pertinent portions of the circuitry illustrated in Fig. 1.

Referring to Fig. 3 there is shown a schematic diagram of pertinent portions of the arrangement outlined above for developing the pedestal pulses. A subcarrier wave of 3.56 mc. is generated in an oscillator circuit 18 comprising a triode vacuum tube 42 which is applied along with a 189 kc. square wave derived from a shaping circuit 14 comprising another triode tube 44, to a keying tube 46. Bursts of the 3.56 mc. subcarrier oscillations are developed across a load resistor 48 connected to an anode of the keying tube 46. By means of a coupling capacitor 52 and a tuned circuit 56, which is arranged to generate the monochrome pips necessary for producing the alternate black-and-white monochrome margins for the color bars, and a subcarrier amplitude determining potentiometer 58, the oscillations are applied to a triode vacuum tube 62. The triode 62 in conjunction with another triode 63 constitute the combining circuit 24 for developing the test signal across a load resistor 64 connected in common to the anode elements of the tubes 62, 63. Synchronizing pulses are shaped in a synchronizing pulse shaping circuit 22 comprising a triode tube 66 for application to the control grid of the other mixing tube 63. The offset subcarrier level is adjusted by means of a variable resistor 68 in the cathode of the one mixer tube 62 and the amplitude of the synchronizing pulse is determined by an adjustable resistor 69 in the cathode of the other mixing tube 63. For further details of the circuit thus described reference is made to the above mentioned copending application Serial No. 440,358.

According to the invention the pedestal pulse wave is obtained by a circuit shown connected to the cathode electrode of the keying tube 46. An impedance element 72 is interposed in the cathode electrode lead and a series resonant circuit 73 is connected between the impedance element 72 and a parallel resonant circuit 74 and are so arranged to develop a square wave of time duration coinciding with that of the bursts of offset subcarrier oscillations developed at the anode electrode of the keying tube 46. The series circuit 73 and the parallel circuit 74 are both resonant to the offset subcarrier frequency whereby the wave appearing across calibrated potentiometer 77 is devoid of subcarrier oscillations. If desired the arm 78 of the potentiometer 77 and the arm 79 of a double-throw switch, which is used to turn the pedestal developing circuitry on and off, may be ganged in order to reduce the number of panel controls. The pedestal appearing at the arm 78 is applied by means of a coupling capacitor 82 to the cathode of the mixing tube 63.

Alternatively the pedestal wave might be obtained from the anode electrode of the keying tube 46, or from the screen electrode as desired, and also the pedestal wave might be applied to the control grid of the mixing tube 63 or a screen grid tube might be used for this purpose and the pedestal applied thereto. In such cases it may be necessary to invert the wave at one point, but such inversion is clearly within the capabilities of those skilled in the art. The circuit as shown however, offers advantages not found in other circuits. Because of cathode injection, the pedestal amplitude will never exceed the height of the synchronizing pulses, the height of which is sufficient to saturate the mixing tube 63. From Fig. 3 it is apparent that applicant's arrangement is simple but highly effective. Another alternative connection is to combine the cathode resistor 72 and the potentiometer resistance element 77 in a network in such manner that the resistor 72 is unnecessary.

The effectiveness of the color matrixing circuitry of the receiver is determined with the equipment according to the invention as follows. The switch 79 is set to generate a pedestal and the arm 78 is adjusted to provide the maximum pedestal height, which will be given a value of say 100 percent. The red and green producing electron guns are disabled, preferably by short circuiting the input circuits of these portions of the tricolor kinescope so that only blue color bars are generated. The sixth bar will be the brightest bar. The first to fifth bars will be progressively darker and the seventh to tenth bars will be progressively darker also. The receiver is then adjusted so that the sixth bar just disappears into the background blue. With the receiver so adjusted, the image reproducing device is altered to produce red color bars only and the arm of the potentiometer 78 is adjusted until the third color bar just disappears into the background color. Likewise the green color appearing in the tenth bar is adjusted to just disappear into the background color when the green electron gun only of the color kinescope is operating. If the potentiometer 77 is calibrated from 0 to 100 and the color matrixing circuitry is operated properly the red and green bars should just disappear in their respective backgrounds to the 54 percent plus or minus 5 percent level and 34 percent plus or minus 5 percent level respectively with the receiver adjusted as described. Note that the amount of luminance component in the color bar is inversely proportional to the percentage reading. In other words the percentage reading indicates the relative amount of energy required to obtain the same luminance for the different colors.

Figure 4:
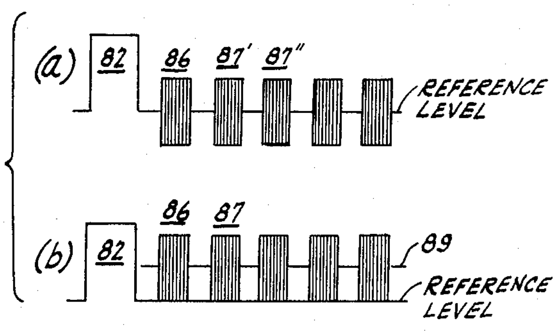
Fig. 4 is a graphical representation of waveforms appearing at the output signal terminals of equipment according to the invention.

Referring to Fig. 4 there is shown a graphical representation of waveforms useful in explanation of the invention. In Fig. 4(*a*) there is shown a waveform comprising a horizontal synchronizing pulse 82 and a number of offset bursts 86, 87 of subcarrier oscillations which extend equally above and below the reference level. The effect of adding a 100 percent pedestal to the waveforms shown in Fig. 4(*a*) is shown at Fig. 4(*b*), wherein all of the bursts 86, 87 are entirely above the reference level. That is to say the A.-C. axis 89 of the bursts has been elevated above the reference level. For lesser amplitudes of pedestal pulse the A.-C. axis 89 will be lower and portions of the bursts will appear below reference level.

While those skilled in the art will determine the values of component parts to be used in applying the invention to their needs, the values listed below which were used for satisfactory operation in a color bar generator for aligning color television receivers, are suggested as a guide in the practice of the invention.

| Ref. No. | Component | Type or Value |
|---|---|---|
| 42 | Subcarrier arc tube | t/s 6U8. |
| 44 | Bar shaping tube | t/s 6U8. |
| 46 | Keying tube | p/s 6U8. |
| 48 | Keying tube load | 1 ko. |
| 52 | Coupling capacitor | 120 mmf. |
| 58 | Subcarrier amplitude potentiometer | 100 ohms. |
| 62, 63 | Mixing tubes | 12AT7. |
| 64 | Mixer load | 1 ko. |
| 66 | Sync. shaping tube | t/s 6X8. |
| 68 | Sync. ampl. level potentiometer | 680–1680. |
| 69 | Subcarrier level potentiometer | 0–1 ko. |
| 72 | Cathode resistor | 120 ohms. |
| 75 | Capacitor | 100 mmf. |
| 76 | Inductor | per at 3.56 mc. |
| 77 | Pedestal height potentiometer | 250 ohms. |
| 82 | Coupling capacitor | 0.25 mf. |

The invention claimed is:

1. Equipment for checking the operation of color matrixing circuitry in a color television receiver having deflection circuitry operating at a given deflection frequency in one direction and color translating circuitry operating at a predetermined subcarrier frequency to produce an image in color on a kinescope, including means for producing a wave at a multiple of said deflection frequency, means coupled to said producing means for deriving a train of pulses of repetition rate corresponding to said deflection frequency, means for generating a substantially sine wave of frequency equal to the difference between said predetermined subcarrier frequency and a multiple including unity of said deflection frequency, means coupled to said wave producing means and to said generating means for producing bursts of subcarrier oscillations, means coupled to said burst producing means and to said pulse deriving means for combining synchronizing pulses and bursts to produce a test signal effective to produce a plurality of color bars on said kinescope of said color television receiver normal to said one direction, means coupled to said burst producing means for developing a train of pedestal pulses of time duration substantially coinciding with said bursts of subcarrier waves, means coupling said pedestal pulse developing means to said combining means for subtracting a luminance component from the bursts in said test signal, and means interposed in said coupling means for adjusting the amplitude of said pedestal pulses.

2. Equipment for checking the operation of color matrixing circuitry in a color television receiver having deflection circuitry operating at a given horizontal deflection frequency and color translating circuitry operating at a predetermined sub-carrier frequency to produce an image in color on a kinescope including means for producing a wave at a multiple of said horizontal deflection frequency, means coupled to said producing means for deriving a train of pulses of repetition rate corresponding to said horizontal deflection frequency, means for generating a substantially sine wave of frequency equal to the difference between said predetermined subcarrier frequency and a multiple including unity of said horizontal deflection frequency, means coupled to said wave producing means and to said generating means for producing bursts of subcarrier oscillations, means coupled to said burst producing means and to said pulse deriving means for combining synchronizing pulses and bursts to produce a test signal effective to produce a plurality of vertical color bars on said kinescope of said color television receiver, means coupled to said burst producing means for developing a train of pedestal pulses of time duration substantially coinciding with said bursts of subcarrier waves, means coupling said pedestal pulse developing means to said combining means for subtracting a luminance component from the bursts in said test signal, and means interposed in said coupling means for adjusting the amplitude of said pedestal pulses.

3. Equipment for checking the operation of color matrixing circuitry in a color television receiver having deflection circuitry operating at a given horizontal deflection frequency and color translating circuitry operating at a predetermined subcarrier frequency to produce an image in color on a kinescope including means for producing a wave at a multiple of said horizontal deflection frequency, means coupled to said producing means for deriving a train of pulses of repetition rate corresponding to said horizontal deflection frequency, means for generating a substantially sine wave of frequency equal to the difference between said predetermined subcarrier frequency and a multiple including unity of said horizontal deflection frequency, means coupled to said wave producing means and to said generating means for producing bursts of subcarrier oscillations, means coupled to said burst producing means and to said pulse deriving means for combining synchronizing pulses and bursts to produce a test signal effective to produce a plurality of vertical color bars on said kinescope of said color television receiver, means coupled to said burst producing means for developing a train of pedestal pulses of time duration substantially coinciding with said bursts of subcarrier waves, means coupling said pedestal pulse developing means to said combining means for subtracting a luminance component from the bursts in said test signal, means interposed in said coupling means for adjusting the amplitude of said pedestal pulses, and means for calibrating said adjusting means.

4. Equipment for checking the operation of the color matrixing circuitry of color television receivers having circuitry operating at a given horizontal deflection frequency and color translating circuitry operating at a predetermined subcarrier frequency, comprising a circuit oscillating at a multiple of said horizontal deflection frequency, a synchronizing pulse generating circuit coupled to said oscillator to be triggered to produce a train of pulses of repetition rate corresponding to said horizontal deflection frequency, an offset subcarrier oscillator arranged to produce a substantially sine wave of frequency equal to the difference between said predetermined subcarrier frequency and a multiple including unity of said horizontal deflection frequency, a keying circuit coupled to said oscillating circuit and to said subcarrier oscillator to produce bursts of offset subcarrier oscillations, a combining circuit coupled to said keying circuit and to said synchronizing pulse generating circuit to repeat said busts and said synchronizing pulses in a test signal, means coupled to said keying circuit for developing a wave of pedestal pulses coincident with said bursts of offset subcarrier oscillations, and attenuating device coupled to said wave developing means to vary the amplitude of said pedestal pulses, and means coupling said attenuating device to said combining circuit.

5. Equipment for checking the operation of the color matrixing circuitry of color television receivers having circuitry operating at a given horizontal deflection frequency and color translating circuitry operating at a predetermined subcarrier frequency, comprising a circuit oscillating at a multiple of said horizontal deflection frequency, a synchronizing pulse generating circuit coupled to said oscillator to be triggered to produce a train of pulses of repetition rate corresponding to said horizontal deflection frequency, an offset subcarrier oscillator arranged to produce a substantially sine wave of frequency equal to the difference between said predetermined subcarrier frequency and a multiple including unity of said horizontal deflection frequency, a keying circuit coupled to said oscillating circuit and to said subcarrier oscillator to produce bursts of offset subcarrier oscillations, a combining circuit coupled to said keying circuit and to said synchronizing pulse generating circuit to repeat said bursts and said synchronizing pulses in a test signal, a trap circuit coupled to said keying circuit and tuned to said subcarrier frequency for developing a wave of pedestal pulses coincident with said bursts of subcarrier oscillations, an attenating device coupled to said trap circuit to vary the amplitude of said pedestal pulses, and means coupling said attenuating device to said combining circuit to shift the alternating potential axis of said bursts with respect to the alternating potential axis of said synchronizing pulses in said test signal by an amount determined by the setting of said attenuating device.

6. Equipment for checking the operation of color matrixing circuitry of color television receivers having circuitry operating at a given horizontal deflection frequency and color translating circuitry operating at a predetermined subcarrier frequency, comprising a circuit oscillating at a multiple of said horizontal deflection frequency, synchronizing pulse generating circuitry coupled to said oscillator to be triggered thereby to produce a train of synchronizing pulses of repetition rate corresponding to said horizontal deflection frequency, an offset subcarrier oscillator arranged to produce a substantially sine wave of frequency equal to the difference between said predetermined subcarrier frequency and said horizontal deflection frequency, a keying circuit comprising an electron discharge device having grid and cathode electrodes coupled to said oscillating circuit and to said subcarrier oscillator and an anode electrode and arranged for producing bursts of offset subcarrier oscillations between said cathode and anode electrodes, a combining circuit comprising a pair of electron discharge structures having anode elements connected in common and grid and cathode elements, the grid elements of one of said structures being coupled to the anode of said device in said keying circuit and the grid element of the other of said structures being connected to said synchronizing pulse generating circuit to repeat said bursts and said synchronizing pulses at said anode elements, a pedestal amplitude setting resistance element connected in the cathode electrode connections of said keying circuit electron discharge device to produce a train of bursts of offset subcarrier oscillations in synchronous time relationship to said bursts produced at said anode-electrode, a circuit tuned to series resonance at said subcarrier frequency connected across said resistance element to suppress said offset subcarrier oscillations leaving a train of pedestal pulses, and connections between said potentiometer and the cathode element of said other electron discharge structure to vary the relative amplitudes of said repeated bursts with respect to said synchronizing pulses.

7. Equipment for checking the operation of color matrixing circuitry of color television receivers having circuitry operating at a given horizontal deflection frequency and color translating circuitry operating at a predetermined subcarrier frequency, comprising a circuit oscillating at a multiple of said horizontal deflection frequency, synchronizing pulse generating circuitry coupled to said oscillator to be triggered thereby to produce a train of synchronizing pulses of repetition rate corresponding to said horizontal deflection frequency, an offset subcarrier oscillator arranged to produce a substantially sine wave of frequency equal to the difference between said predetermined subcarrier frequency and said horizontal deflection frequency, a keying circuit comprising an electron discharge device having grid and cathode electrodes coupled to said oscillating circuit and to said subcarrier oscillator and an anode electrode and arranged for producing bursts of offset subcarrier oscillations between said cathode and anode electrodes, a combining circuit comprising a pair of electron discharge structures having anode elements connected in common and grid and cathode elements, the grid elements of one of said structures being coupled to the anode of said device in said keying circuit and the grid element of the other of said structures being connected to said synchronizing pulse generating circuit to repeat said bursts and said synchronizing pulses at said anode elements, an impedance element interposed in the cathode electrode connections of said keying circuit electron discharge device to produce a train of bursts of offset subcarrier oscillations in synchronous time relationship to said bursts produced at said anode-electrode, a circuit tuned to series resonance at said subcarrier frequency connected across said impedance element to suppress said offset subcarrier oscillations leaving a train of pedestal pulses, a calibrated pedestal amplitude setting potentiometer, connections including a circuit tuned to parallel resonance at said subcarrier frequency for connecting said potentiometer to said impedance element, and connections between said potentiometer and the cathode element of said other electron discharge structure to vary the relative amplitudes of said repeated bursts with respect to said synchronizing pulses.

References Cited in the file of this patent

UNITED STATES PATENTS

| | | |
|---|---|---|
| 2,559,388 | Baldridge | July 3, 1951 |
| 2,683,187 | Rynn | July 6, 1954 |